United States Patent [19]

Takano et al.

[11] 4,023,183

[45] May 10, 1977

[54] ROTARY DEFLECTION ELECTRODES IN AN INK JET SYSTEM PRINTER

[75] Inventors: Rikuo Takano, Musashino; Yuji Sumitomo, Nara; Yoichi Yamamoto, Nara; Masahiko Aiba, Nara; Tokio Maezawa, Yamatokoriyama, all of Japan

[73] Assignees: Nippon Telegraph and Telephone Public Corporation, Tokyo; Sharp Kabushiki Kaisha, Osaka, both of Japan

[22] Filed: Oct. 31, 1975

[21] Appl. No.: 627,652

[30] Foreign Application Priority Data

Oct. 31, 1974 Japan ............................ 49-126148

[52] U.S. Cl. ............................... 346/75; 346/140 A

[51] Int. Cl.$^2$ ........................................ G01D 15/16

[58] Field of Search ............. 346/75, 140; 118/627, 118/628, 638, 640

[56] References Cited

OTHER PUBLICATIONS

Burns, H. R.; *Automatic Ink Jet Deflection Plate Cleaner*; IBM Tech. Disc. Bulletin, vol. 16, No. 9, Feb. 1974, pp. 3035–3036.

Bruce et al.; *Removal of Ink "Mist" in an Ink Jet Printer*; IBM Tech. Disc. Bulletin, vol. 17, No. 10, Mar. 1975, pp. 3022–3022A.

*Primary Examiner*—Joseph W. Hartary

*Attorney, Agent, or Firm*—Birch, Stewart, Kolasch & Birch

[57] ABSTRACT

A pair of rotary deflection electrodes are provided to confront with each other in an ink jet system printer in order to deflect charged ink droplets emitted from a nozzle as they pass through a high voltage electric field established therebetween. Cleaners are installed close to the rotary deflection electrodes at the position where the electric field established between the rotary deflection electrodes will not be disturbed by the cleaners in order to sweep the rotary deflection electrodes as they rotate.

11 Claims, 9 Drawing Figures

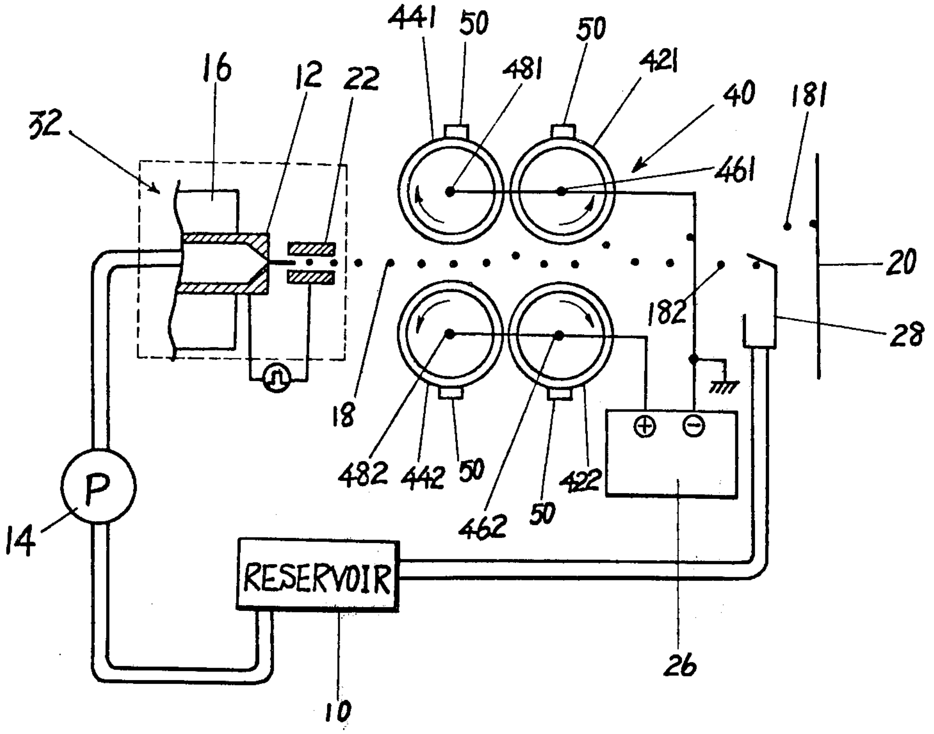

FIG. 1

```
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
```

FIG. 8 PRIOR ART

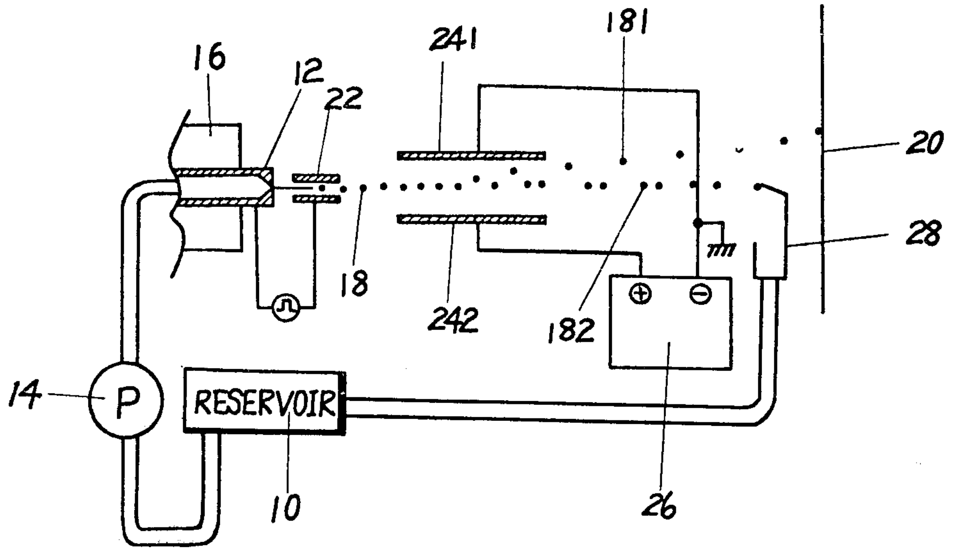

FIG. 6 Prior Art

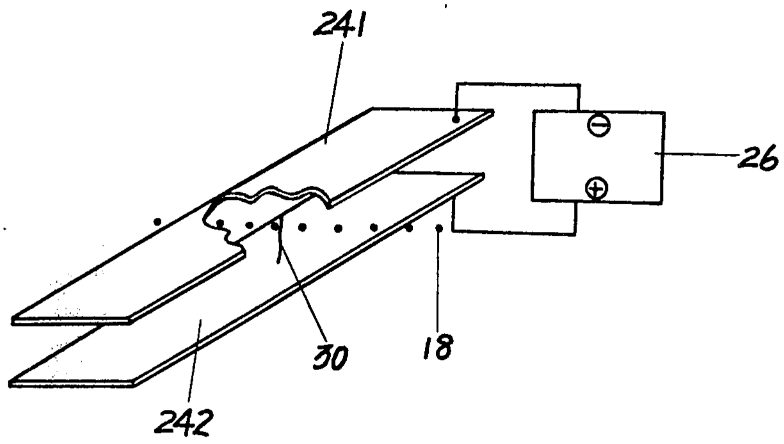

FIG. 7 Prior Art

```
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
&'()*+,-./0123456789:;<=>?@ABCDEFGHIJKLMNOPQRSTUVWXYZ[¥]^_
```

FIG. 9

ROTARY DEFLECTION ELECTRODES IN AN INK JET SYSTEM PRINTER

BACKGROUND OF THE INVENTION

The present invention relates to rotary deflection electrodes for use in an ink jet system printer.

Undesirable dust as thread drifting in the air will be captured in a deflection section in an ink jet system printer because of a high voltage electric field established by deflection electrodes. This causes printing distortion since non-uniformity will be created in the electric field by the dust captured in the deflection section and/or traveling ink droplets emitted from a nozzle will come into collision with the dust captured in the deflection section.

When the ink droplets impinge upon a recording paper at very high speeds, ink fog is unavoidably diffused in various directions. The ink fog bears the same charge as the ink droplet from which it originates and, therefore, the ink fog tends to be attached toward one of the deflection electrodes which is biased with opposite polarities from the ink fog. Hence, the ink fog becomes attached to the deflection electrode, which may cause the system to operate erroneously or break down, since the insulation of the system can not be maintained.

In the conventional plate shaped deflection electrodes, the above-mentioned dust captured in the deflection section and the ink fog attached to the deflection electrodes could not be removed, since the conventional deflection plates were stationarily fixed to the system or to a carriage.

OBJECTS AND SUMMARY OF THE INVENTION

Accordingly, an object of the present invention is to provide an ink jet system printer which can minimize printing distortion and an erroneous operation.

Another object of the present invention is to improve deflection electrodes in an ink jet system printer.

Still another object of the present invention is to provide rotary deflection electrodes for use in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to one embodiment of the present invention, a pair of rotary deflection electrodes are provided to confront with each other in an ink jet system printer in order to deflect charged ink droplets emitted from a nozzle as they pass through a high voltage electric field established therebetween. Cleaners are installed close to the rotary deflection electrodes at the position where the electric field established between the rotary deflection electrodes will not be disturbed by the cleaners in order to brush off the rotary deflection electrodes as they rotate.

Undesirable dust and ink fog attached to the deflection electrodes will be removed by the cleaners and, therefore, the printing distortion and the erroneous operation of the system caused by the dust and/or the ink fog can be eliminated.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a schematic sectional view of an ink jet system printer employing an embodiment of rotary deflection electrodes of the present invention;

FIG. 6 is a schematic sectional view of the conventional ink jet system printer;

FIG. 7 is a perspective view of the conventional deflection electrodes;

FIG. 8 is a photographic copy showing printing distortion formed by the conventional ink jet system printer of FIG. 6; and FIG. 9 is a photographic copy showing normal printing without the distortion shown in FIG. 8.

DESCRIPTION OF THE PREFERRED EMBODIMENTS

Figure 2:
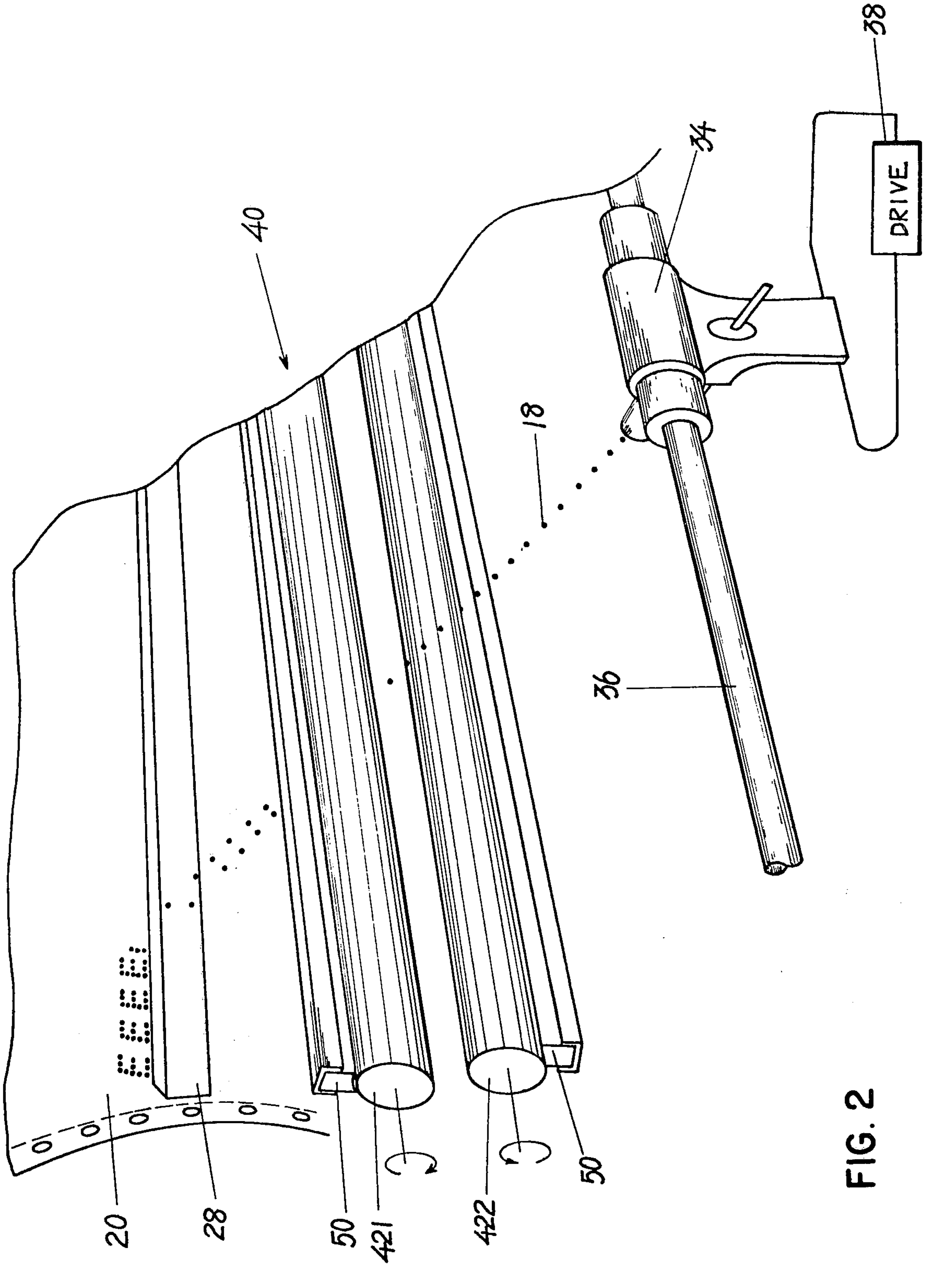
FIG. 2 is a schematic perspective view of an essential part of the ink jet system printer of FIG. 1.

Referring now in detail to the drawings, and to facilitate a more complete understanding of the present invention, an ink jet system printer and deflection electrodes of the prior art will be first described with reference to FIGS. 6 through 8.

In general, an ink jet system printer is constructed as shown in FIG. 6. Ink liquid contained within an ink reservoir 10 is sent under pressure to a nozzle 12 through a pump 14. The nozzle 12 is held by an ink droplet issuance unit including an electro-mechanical transducer 16 such as a piezo-vibrator. The ink liquid issuing from the nozzle 12 is excited by the electro-mechanical transducer 16 so that ink droplets 18 of a uniform mass and of a frequency equal to the exciting signal frequency are formed. The ink droplets 18 spaced from each other by a constant distance are directed toward a recording paper 20.

The individual ink droplets 18 are charged in response to printing information to selected amplitudes with the use of a charging electrode 22 in a known manner, and are deflected in accordance with the amplitude of charges on the droplets as they pass through a high-voltage electric field established by a pair of deflection plates 241, 242, to which a high-voltage source 26 is connected. Ink droplets 181 are then deposited on the recording paper 20 in order to record a desired symbol.

Ink droplets 182, not contributive to writing operation, travel in a rectilinear direction or are deflected in the opposite direction to droplets 181. Hence, the ink droplets 182 are not deposited on the recording paper 20. The ink droplets 182 are directed to a beam gutter 28 in order to recirculate waste ink liquid to the ink reservoir 10.

The deflection plates 241, 242 are, in general, stationarily fixed to the ink jet system printer. When undesirable dust such as thread drifting in the air comes near the deflection plates 241 and 242, the dust will be attracted toward the deflection plates 241 and 242 and attached to one of the deflection plates 241, 242 to stand along the electrical force line established between the deflection plates 241, 242 as shown by the reference number 30 in FIG. 7.

Thus captured dust 30 will disturb the electric field established between the deflection plates 241 and 242. Moreover, the ink droplets 18 will come into collision with the captured dust 30, which will result in the printing distortion. FIG. 8 shows the above-mentioned printing distortion occurred on the capital letter "C". It will be clear from FIG. 8 that the printing distortion occurs on the same column in the printed copy when the deflection plates 241 and 242 are stationarily fixed to the system and the nozzle 12 and the charging electrode 22 are driven to travel in the horizontal direction during the printing operation.

Referring now to FIG. 1, there is illustrated an ink jet system printer employing an embodiment of rotary deflection electrodes of the present invention, wherein like elements corresponding to those of FIG. 6 are indicated by like numerals.

The ink droplets 18 are formed and charged in a same manner as performed in the ink jet system printer of the prior art already discussed above with reference to FIG. 6. The nozzle 12, the electro-mechanical transducer 16 and the charging electrode 22 form, in combination, a printing head 32. The printing head 32 is installed on a carriage 34, which is slidably supported by a shaft 36 as shown in FIG. 2. The carriage 34 is controlled to travel in the horizontal direction by a carriage drive system 38 as is well known in the art during the printing operation.

The charged ink droplets 18 are deflected in accordance with the amplitude of charges on the droplets as they pass through a high-voltage electric field established in a deflection section 40. The conventional deflection plates 241 and 242 are replaced by two pairs of rotary deflection electrodes 421, 422 and 441, 442 in the ink jet system printer of the present invention.

The respective rotary deflection electrodes 421, 422, 441 and 442 are made of cylinder shaped metal and driven to rotate about their shafts 461, 462, 481 and 482 in the directions shown by respective arrows in FIGS. 1 and 2 at a constant velocity, for example, 10 revolutions per minute. The high-voltage source 26 is connected to the rotary deflection electrodes 421, 422, 441 and 442 through the shafts 461, 462, 481 and 482 to establish a high-voltage electric field between the rotary deflection electrodes 421 and 422 and between the rotary deflection electrodes 441 and 442. Cleaning pads 50 made of, for example, chamois are installed close to the rotary deflection electrodes 421, 422, 441 and 442 at the position where the electric field established between the rotary deflection electrodes will not be disturbed by the cleaning pads 50.

The undesirable dust attached to the rotary deflection electrodes 421, 422, 441 and 442 will be removed by the cleaning pads 50 as the rotary deflection electrodes rotate. The ink fog attached to the rotary deflection electrodes will also be removed by the cleaning pads 50, thereby the printing distortion and the erroneous operation will be minimized. Moreover, undesirable discharge from the edge of the deflection electrodes will be prevented since the deflection electrodes are cylinder shaped.

Figure 3:
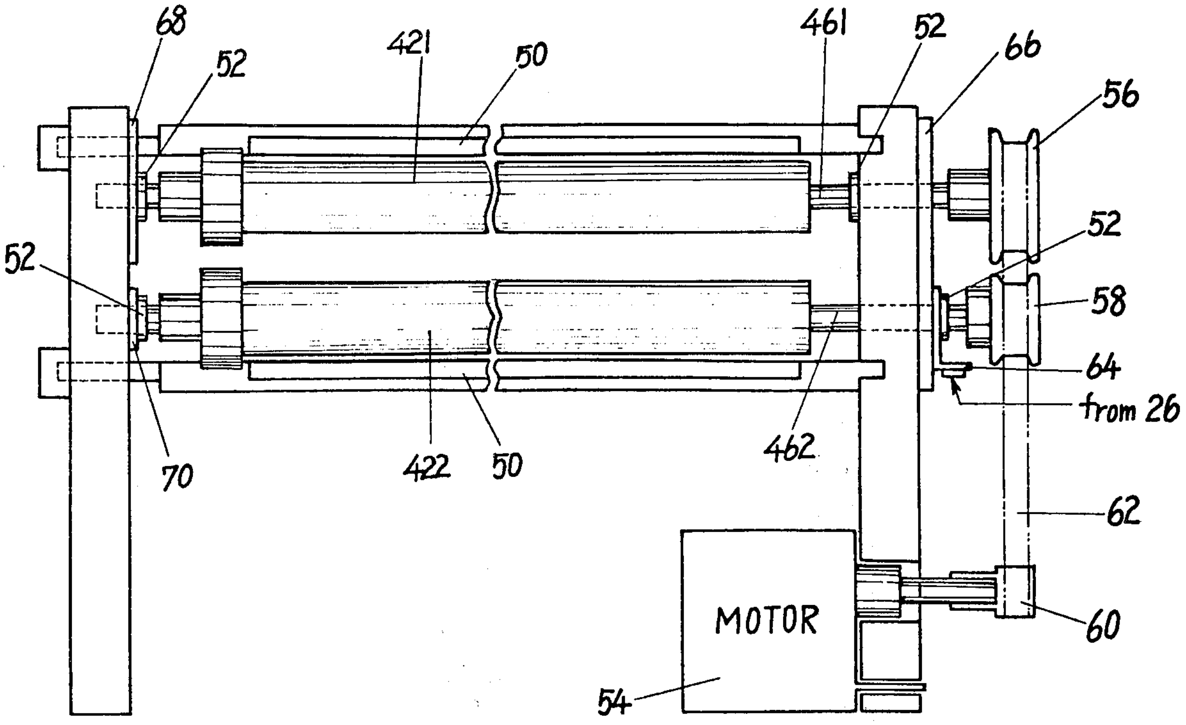
FIG. 3 is a front view showing a drive system of the rotary deflection electrodes.

FIG. 3 shows a drive system of the rotary deflection electrodes, wherein the rotary deflection electrodes 441 and 442 are omitted for the purpose of simplicity, since they can be driven in the same manner as for the electrodes 421 and 422.

The rotary deflection electrodes 421 and 422 are rotatably supported by bearings 52 and driven to rotate by a motor 54 through pulleys 56, 58, 60 and a belt 62. The lower rotary deflection electrode 422 is isolated from the system via an insulating pad 70 and connected to the positive terminal of the high-voltage source 26 via the bearing 52 and an angle 64 which is fixed to an insulating plate 66 and electrically isolated from the system through the use of the insulating plate 66. The upper rotary deflection electrode 421 is maintained at the ground potential via the bearing 52 and a metal plate 68 fixed to the system.

Figure 4:
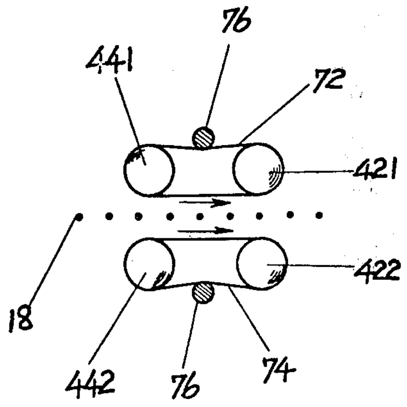
FIG. 4 is a schematic sectional view of another embodiment of rotary deflection electrodes of the present invention.

Referring now to FIG. 4, there is illustrated another embodiment of the rotary deflection electrodes of the present invention, conductive belts 72 and 74 are installed between the rotary deflection electrodes 421 and 441, and 422 and 442, respectively. The belt 74 is connected to the positive terminal of the high-voltage source 26 via the rotary deflection electrode 422 and driven to travel in the direction show by the arrow by the rotary deflection electrode 422 which is driven by the motor 54. The belt 72 is kept at the ground potential and driven to travel in the direction shown by the arrow via the rotary deflection electrode 421. Cleaning pads 76 made of, for example, chamois are provided close to the conductive belts 72 and 74 at the position where the electric field established between the belts 72 and 74 will not be disturbed by the cleaning pads 76.

Figure 5:
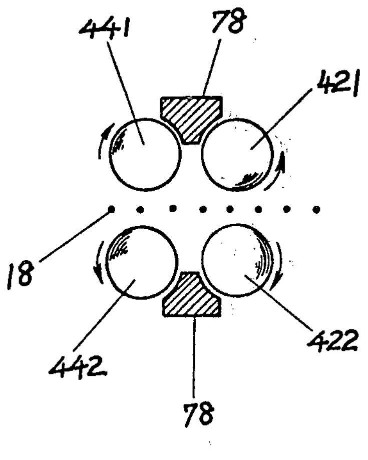
FIG. 5 is a schematic sectional view of still another embodiment of rotary deflection electrodes of the present invention.

FIG. 5 shows still another embodiment of the present invention. Two cleaning pads 78 are installed to sweep the rotary deflection electrodes 421 and 441, and 422 and 442, respectively, instead of the four cleaning pads 50 shown in FIG. 1.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In combination with an ink jet system printer which emits charged ink droplets from a nozzle toward a record receiving member and selectively deflects said ink droplets by deflection means and records desired symbols on said record receiving member with said selectively deflected ink droplets, the deflection means comprising:

a high voltage source;

a pair of rotary deflection electrode means connected with said high-voltage source to establish a high-voltage electric field between said pair of rotary deflection electrode means; and cleaning means continuously juxtaposed with said rotary deflection electrode means to clean said rotary deflection electrode means during rotation thereof.

2. The combination of claim 1 which further includes motor means driving said pair of rotary deflection electrode means at a constant velocity of rotation.

3. The combination of claim 2 wherein the constant velocity is about 10 revolutions per minute.

4. The combination of claim 1 wherein said rotary deflection electrode means comprise cylindrical electrodes and motor means rotating said cylindrical electrodes.

5. The combination of claim 1 wherein said cleaning means are positioned where the high-voltage electric field established between the rotary deflection electrode means will not be disturbed by said cleaning means.

6. The combination of claim 1 wherein the cleaning means comprise pads made of chamois.

7. The combination of claim 1 wherein said pair of rotary deflection electrode means comprise driving rollers and a pair of conductive endless belts supported by and driven to rotate by said driving rollers, said driving rollers being connected with said high-voltage source.

8. The combination of claim 1 wherein one of said pair of rotary deflection electrode means is kept at the ground potential.

9. The combination of claim 8 wherein the other of said pair of rotary deflection electrode means is connected to receive a high-voltage potential and insulated from the system printer.

10. In combination with an ink jet system printer which emits charged ink droplets from a nozzle toward a record receiving member and selectively deflects said ink droplets by deflection means and records desired symbols on said record receiving member with said selectively deflected ink droplets, the deflection means comprising:

a cylinder shaped deflection electrode driven to continuously rotate by a motor through a driving system; and cleaning means installed close to the cylinder shaped deflection electrode in such a manner to continuously contact the cylinder shaped deflection electrode in order to sweep the electrode as it rotates.

11. In combination with an ink jet system printer which emits charged ink droplets from a nozzle toward a record receiving member and selectively deflects said ink droplets by deflection means and records desired symbols on said record receiving member with said selectively deflected ink droplets, self cleaning deflection means comprising:

a cylinder shaped deflection electrode mounted for rotation on its longitudinal axis;

motor means for driving said electrode in rotation; and cleaning means mounted in coexterminous juxtaposition with said cylinder shaped deflection electrode in such a manner as to sweep said electrode as it rotates.

* * * * *